Aug. 5, 1952     A. G. OMAR ET AL     2,605,718
LIGHT RAILWAY VEHICLE WITH REVERSIBLE TRIANGULAR TRACTION
Filed May 31, 1945     5 Sheets-Sheet 1
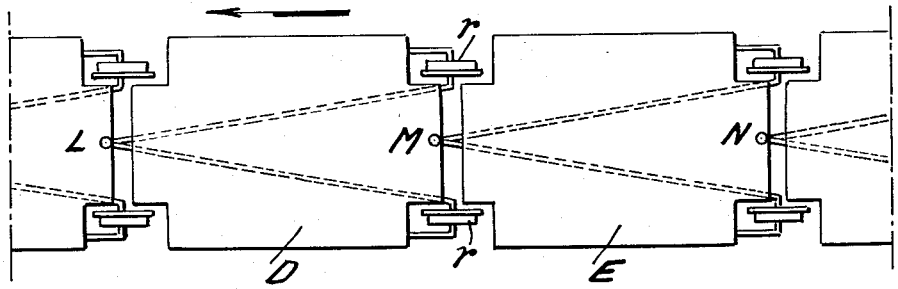
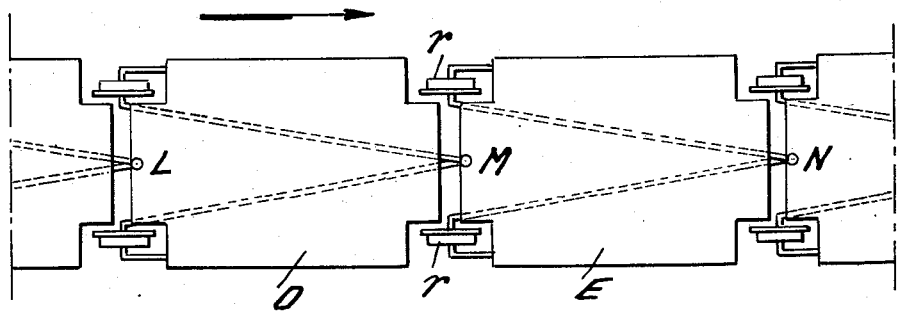
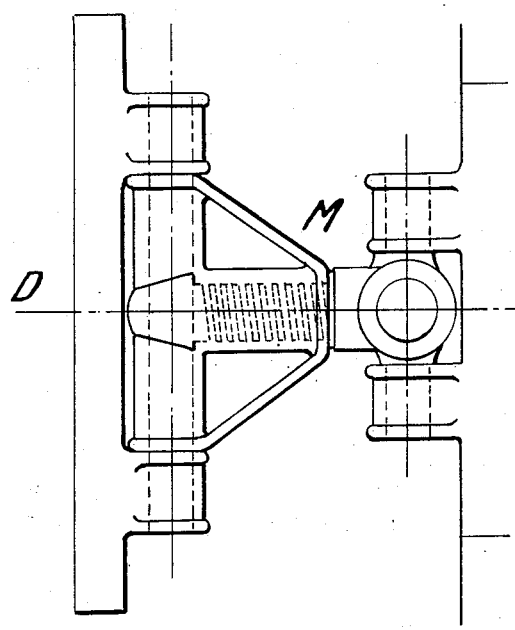
INVENTORS
ALEJANDRO GOICOECHEA OMAR
LUCAS M. DE ORIOL Y URQUIJO
JAMES J. P. MAC VEIGH
BY
Byerly Townsend & Watson
ATTORNEYS

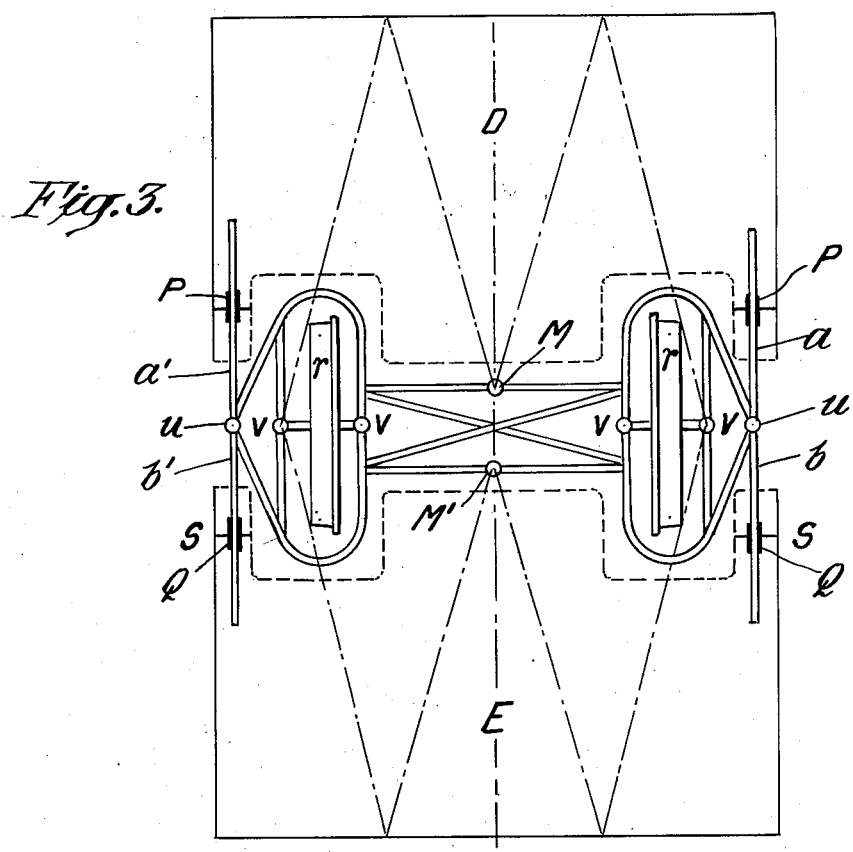
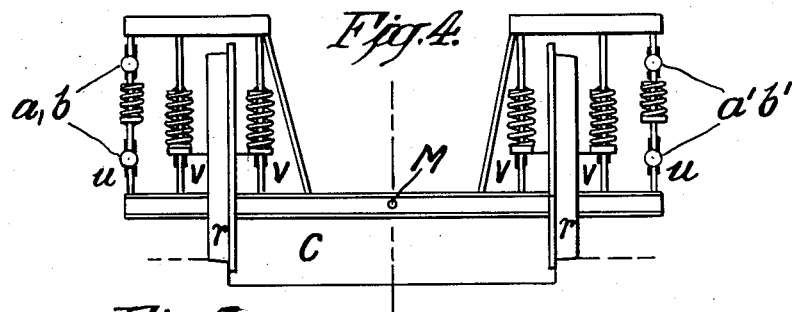
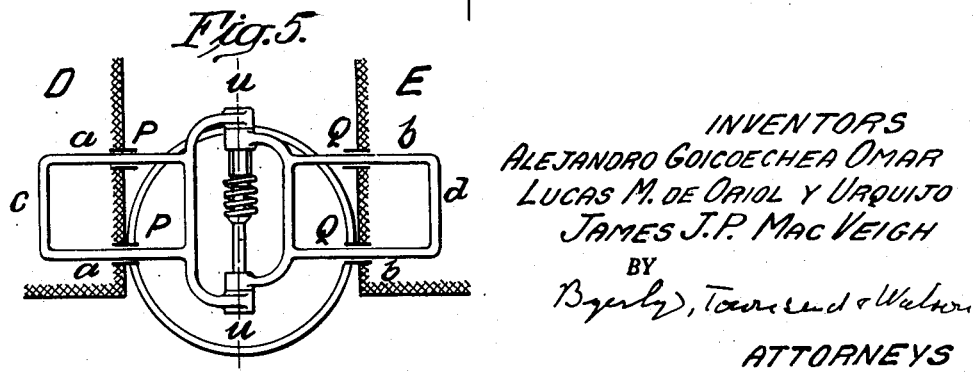

Aug. 5, 1952 A. G. OMAR ET AL 2,605,718
LIGHT RAILWAY VEHICLE WITH REVERSIBLE TRIANGULAR TRACTION
Filed May 31, 1945 5 Sheets-Sheet 3
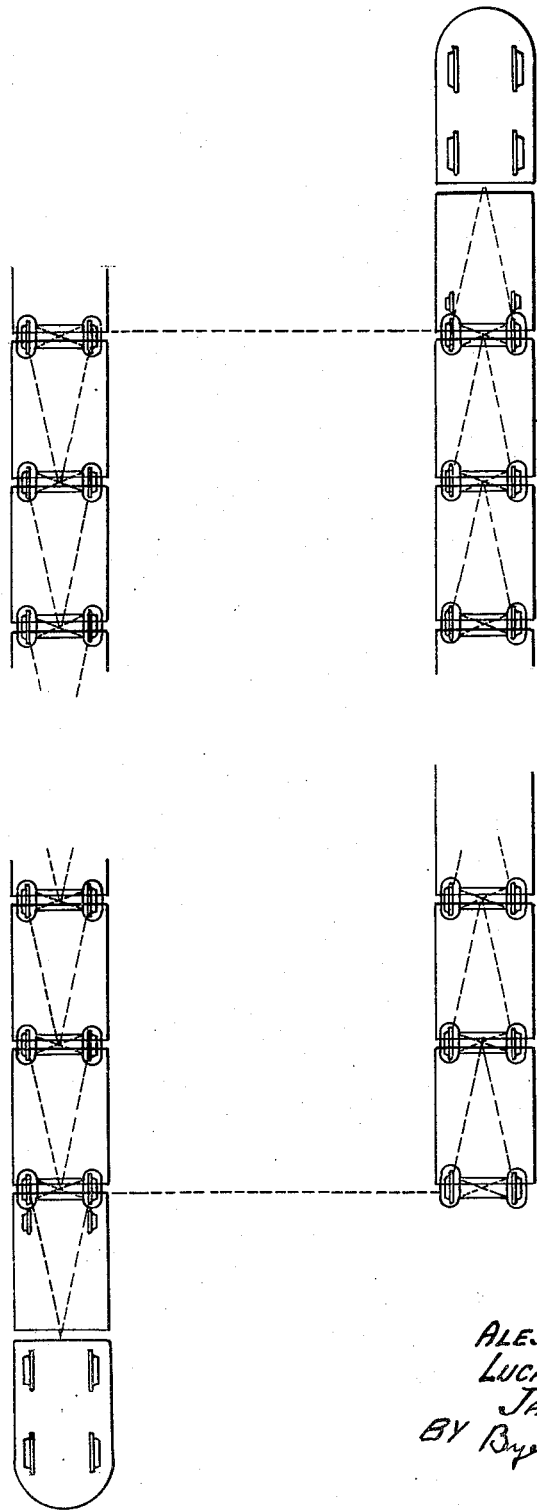
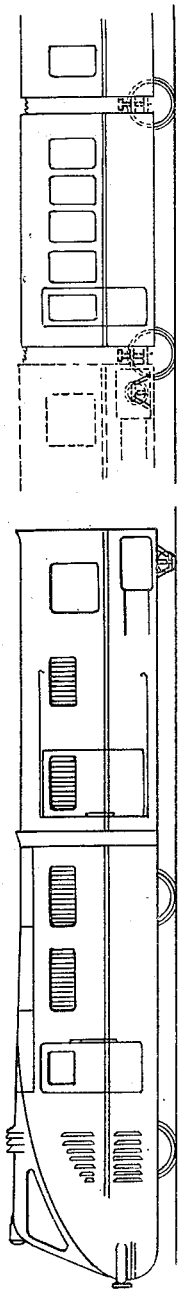
INVENTORS
ALEJANDRO GOICOECHEA OMAR
LUCAS M. DE ORIOL Y URQUIJO
JAMES J. P. MAC VEIGH
BY Byerly, Townsend, Watson
ATTORNEYS Aug. 5, 1952  A. G. OMAR ET AL  2,605,718
LIGHT RAILWAY VEHICLE WITH REVERSIBLE TRIANGULAR TRACTION
Filed May 31, 1945  5 Sheets-Sheet 4

INVENTORS
ALEJANDRO GOICOECHEA OMAR
LUCAS M. DE ORIOL Y URQUIJO
JAMES J. P. MAC VEIGH
BY
Byerly, Townsend & Watson
ATTORNEYS

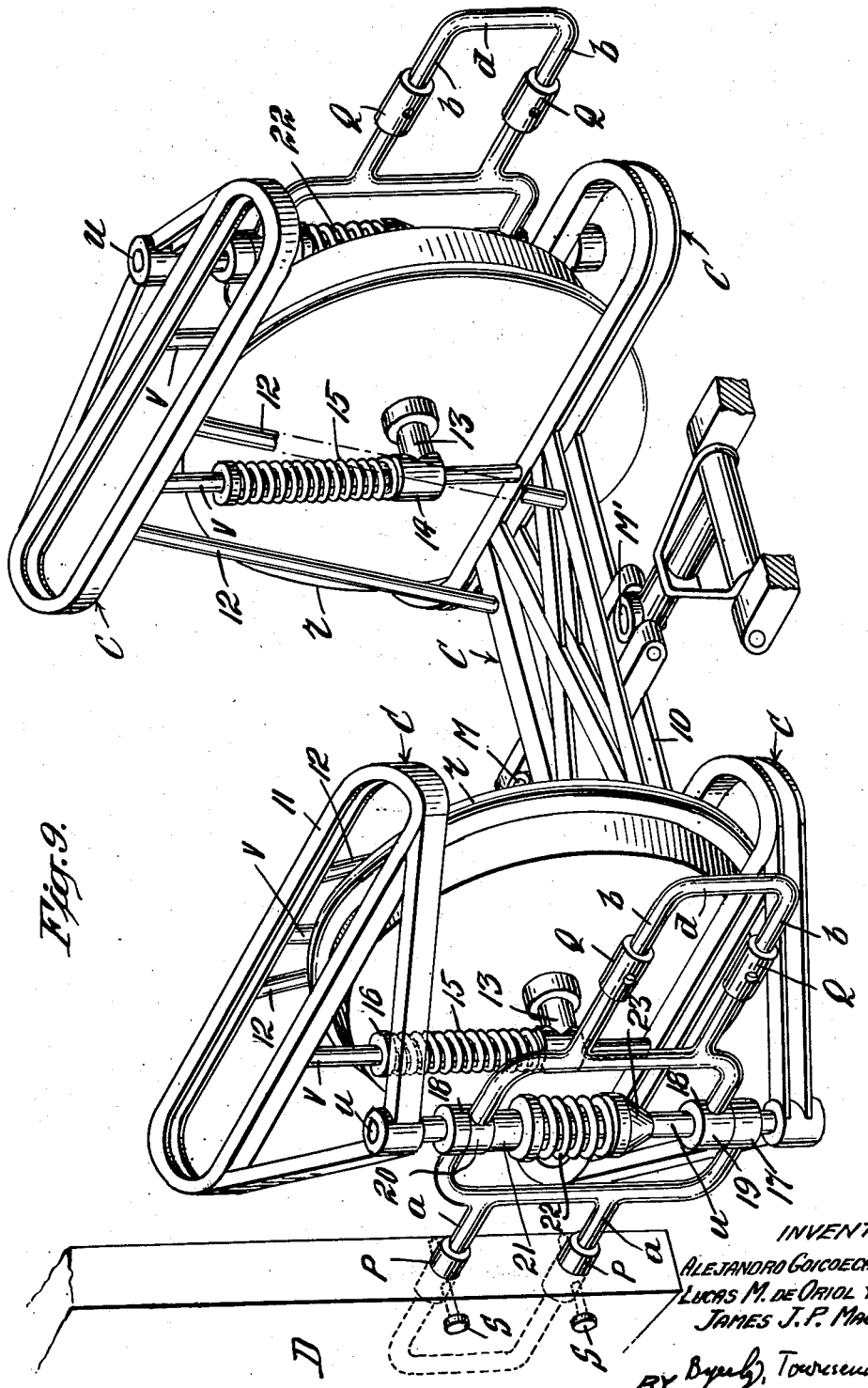

Patented Aug. 5, 1952

2,605,718

UNITED STATES PATENT OFFICE 2,605,718

LIGHT RAILWAY VEHICLE WITH REVERSIBLE TRIANGULAR TRACTION

Alejandro Guicoechea Omar, Lucas M. de Oriol y Urquijo, and James J. P. MacVeigh, Madrid, Spain, assignors to Patentes Talgo, S. A., Madrid, Spain, a corporation of Spain Application May 31, 1945, Serial No. 596,886
In Spain July 8, 1944

2 Claims. (Cl. 105—4)

The object of the present invention is to provide a reversible railway train in which the wheels are guided so as to attack the tracks at a negative angle on the curves regardless of the direction in which the train is running.

With the advantage obtained by the construction shown in the copending application Serial No. 661,699 filed April 12, 1946, by one of us on which U. S. Patent 2,462,666 was issued on February 22, 1949, the rolling guided by triangular traction does not enable the circulation of the trains formed by the elements of the characteristics described in the patents mentioned, in both running directions. The angle of attack of the wheels which is negative, that is, safe in the one running direction, is positive in the opposite direction in the trains mentioned.

The irreversibility of these trains makes it difficult for them to be put into service by the companies working the railroad lines.

This difficulty is eliminated if we mount the wheels, not directly in the elements, but in a frame which can be incorporated rigidly in one element or the other, according to the running direction.

Figs. 1 and 2 are diagrammatic plan views of a train embodying the invention indicating the way in which the wheels are connected to the body elements when the train is running in opposite directions;

Fig. 3 is a diagrammatic plan view of a two-wheel truck of the train including a phantom view of the ends of the two body elements which are supported on this truck;

Fig. 4 is a diagrammatic end elevation of the truck;

Fig. 5 is a diagrammatic side elevation of the truck indicating in vertical section portions of the body elements supported by the truck;

Fig. 6 is an enlarged detail view of the traction connection between the truck and one of the body elements;

Fig. 7 is a diagrammatic plan view showing the train embodying the invention arranged for running in opposite directions;

Fig. 8 is a side view of the train shown in Fig. 7.

Fig. 9 is a perspective view of the two-wheel truck shown in Figs. 3, 4 and 5.

This important improvement is shown in Figures 1 and 2 of the enclosed drawing.

In Figure 1 we have the articulated train which this patent claims running toward the left:

1. The wheels $r$—$r$ are rigidly connected with the element D. The point of traction L forms with the wheels $r$—$r$ the triangle L$rr$.
2. The element E rotates in a horizontal plane about the point M.

Running to the right (Figure 2), we have:

1. The wheels $r$—$r$ are rigidly connected with the element E. The point of traction M of this element forms with the same wheels $r$—$r$ the triangle M$rr$.
2. The element D rotates now in a horizontal plane about the point M, from where the forces of traction are transmitted.

In order to effect this operation with the necessary speed and safety there is used the wheel truck between each pair of elements which will be described in the following.

In Figures 3 and 4 we represent, in plan and elevation, respectively, a diagram of the truck in the form preferred in this invention, the variations of its form not to be considered as a novelty over what has been claimed. This preferred solution incorporates at the same time a "double action" of suspension which notably improves the running of the train.

The truck is constituted by a frame C which carries the point "M" "M'" for the attachment of the couplings or points of traction, and the vertical rods "$uvv$," over which the suspended pieces are slid. The wheels are mounted in an elastic support which in relation to the truck can be vertically displaced, with guided displacement by the inside rods "$vv$." This constitutes the first step of suspension.

The second step of suspension is that of the elements in relation to the truck, through the arrangement shown in Figure 5, in detailed elevation.

Into the bearings "PP," mounted in the element "D," there enter the cylindrical girders "$aa$." which form the tubular frames "$a$—$c$—$a$." Into the bearings "QQ," mounted in the element E, there enter the cylindrical girders $bb$, which form the tubular frame "$bdb$." The frames "$a$—$c$—$a$" and "$b$—$d$—$b$" transmit the weights of the elements D and E, respectively, to the truck, through the vertical rods "$u$," axis of rotation of the frames mentioned.

The points of traction M and M' are calculated for being able to support all lateral thrusts, enabling the rotation of the chassis about the elements; but not the displacement of the truck in relation to the elements in perpendicular direction to the road, and in longitudinal direction (see Figure 6).

Figure 7A:
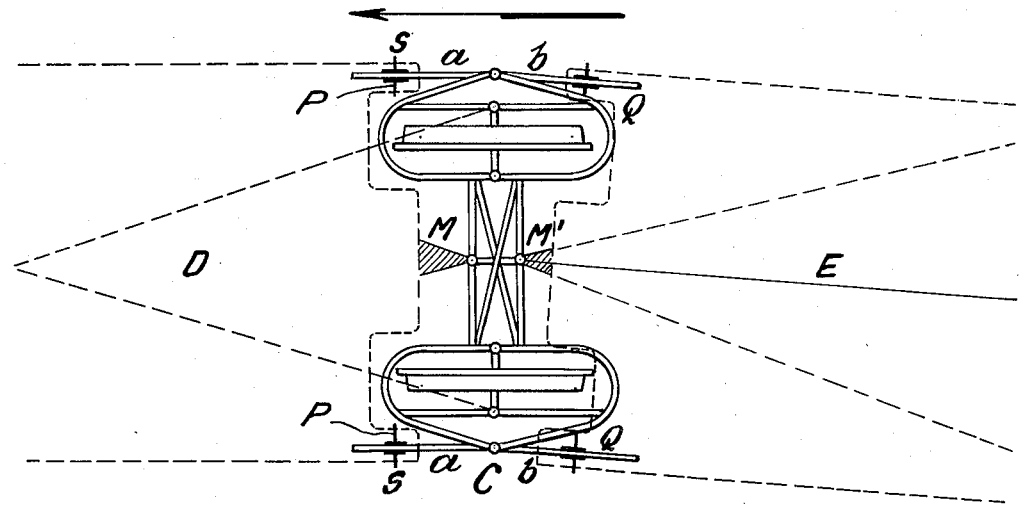
Fig. 7a is a diagrammatic plan view of the two-wheel truck between two of the body elements showing parts of the body elements in phantom view and indicating the connections between the truck and the body elements when the train is running to the left and rounding a curve.

If by means of two bolts SS we arrest the bars aa in the bearings PP of the elements D (Figure 7a) due to the fact that the coupling M does not permit lateral or longitudinal displacement, as we have already indicated, the truck C will remain rigidly incorporated with the element D. The element E will rotate about the point M' moving the bars bb in and out of the bearings QQ of this element.

Figure 7B:
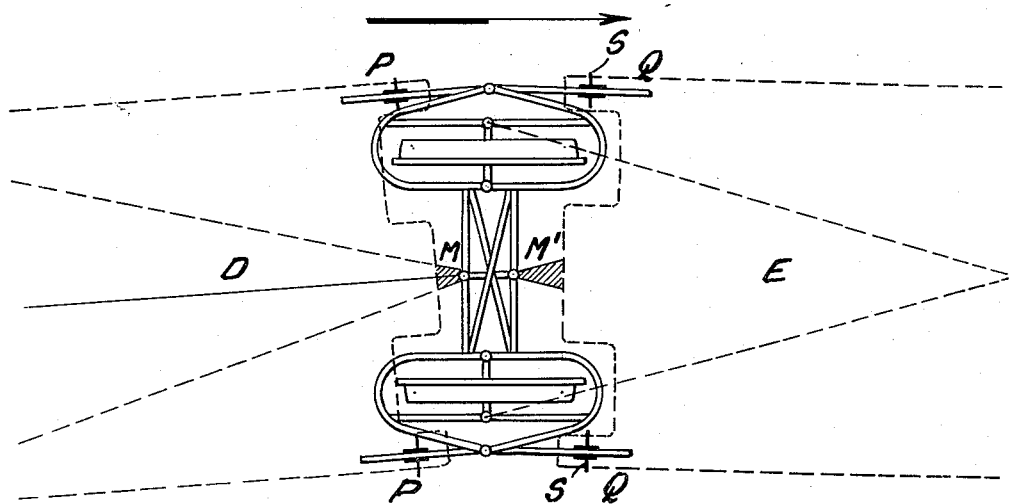
Fig. 7b is a similar view indicating the connections when the train is running to the right and rounding a curve.

If, on the other hand (Figure 7b), we remove the bolts from the bearings PP of the elements D and bring them to the bearings QQ of the element E (operation which evidently will have to be made in a straight line), the triangles will be inverted and the running direction is to the right. Now the element D revolves about the point M, while the rotation of M' is eliminated for the reason that the play of the bars bb inside the bearings QQ is impeded.

It is to be noted that the fact that the frame a—c—a and b—d—b can revolve about the rod u does not make the coupling of the truck less rigid in relation to the elements; in fact, the pivots M M' alone enable the rotation of the elements about these points, with whose rotation the frame a—c—a tend to place themselves in the bearings P, and to leave the bearings P'. Since this is prevented by the bolts S, in one running direction, there can be no such revolution.

The Figures 7 show these frames according to the invention, applied to a unit of articulated train.

Finally, to facilitate connecting and disconnecting of the tractor in relation to the train, the front cars carry replaceable wheels in the form which Figure 8 illustrates.

Fig. 9 shows the truck and a part of one of the side walls of the car body element D. The car body element E at the other side of the truck is omitted for the sake of clearness. The frame C of the truck consists of a lower structural member 10 which extends between and around the wheels r—r and upper structural members 11 which are connected to the lower structural member 10 by the vertical rods uvv and by inclined braces 12. The wheels r—r rotate on short axles 13 whose ends are held in slides 14 on the rods vv. Compression springs 15 react between the slides 14 and stops 16 so that the truck frame is resiliently mounted on the wheels.

The tubular frame a—c—a is mounted on collars 17, 18 which are slidable on the rod u. The tubular frame bdb is mounted on similar collars 19, 20. The collar 20 rests on a sliding collar 21 which is carried by a compression spring 22 whose lower end is held by a stop 23 fixed on the rod u. In this way, the weight of the car body elements D and E is resiliently supported by the truck frame C.

Small angular movements of the cylindrical girders aa and bb in the bearings PP, QQ is permitted either by the provision of a slight play indicated in Fig. 5 or by the use of silent block bearings slightly resilient material.

We claim:

1. An articulated railway vehicle comprising a plurality of pairs of wheels, a plurality of rigid sections each having its rear end mounted on one pair of wheels, connecting means for the adjacent ends of adjacent sections consisting of a central traction connection including a vertical pivot connected to one section end and a close-fitting bearing connected to the other section end, and lateral connections each consisting of a horizontal slide pivotally mounted on one section end to turn about a vertical axis, and a guide for said slide fixed on the other section end operable to permit angular and longitudinal movement of said slide in said guide.

2. In a reversible articulated railway vehicle consisting of a plurality of two-wheel trucks and rigid body elements extending between the trucks, a connection between each truck and the end of each body element adjacent to it comprising a central pivotal traction connection which takes all longitudinal forces, longitudinal telescopic connections at the sides of the vehicle pivotally connecting each truck and the end of each body element adjacent to it, and removable means for locking said telescopic connections against telescopic movement so that each truck may be locked against said telescopic movement to one of the body elements adjacent to it while remaining pivotally connected to the other adjacent body element.

ALEJANDRO GUICOECHEA OMAR.
LUCAS M. DE ORIOL Y URQUIJO.
JAMES J. P. MacVEIGH.

REFERENCES CITED

The following references are of record in the file of this patent:

UNITED STATES PATENTS

| Number | Name | Date |
|---|---|---|
| 267,335 | Driggs | Nov. 14, 1882 |
| 1,480,634 | Putnam | Jan. 15, 1924 |
| 2,098,949 | Geissen | Nov. 16, 1937 |
| 2,373,348 | Schroeder et al. | Apr. 10, 1945 |
| 2,462,666 | Omar | Feb. 22, 1949 |